US011898724B1

(12) United States Patent
Callanan et al.

(10) Patent No.: US 11,898,724 B1
(45) Date of Patent: Feb. 13, 2024

(54) LIGHT CONNECTOR AND LIGHT ASSEMBLY

(71) Applicants: Brian J. Callanan, Buffalo, NY (US); Colleen M. Bohn, Corpus Christi, TX (US); Stephanie A. Bohn, Austin, TX (US)

(72) Inventors: Brian J. Callanan, Buffalo, NY (US); Colleen M. Bohn, Corpus Christi, TX (US); Stephanie A. Bohn, Austin, TX (US)

( * ) Notice: Subject to any disclaimer, the term of this patent is extended or adjusted under 35 U.S.C. 154(b) by 0 days.

(21) Appl. No.: 18/363,047

(22) Filed: Aug. 1, 2023

(51) Int. Cl.
*F21S 9/03* (2006.01)

(52) U.S. Cl.
CPC .................................... *F21S 9/037* (2013.01)

(58) Field of Classification Search
CPC ........... F21S 9/037; F21S 9/032; Y02B 10/10; A47K 11/04; E04D 2013/0345; E04D 13/033
See application file for complete search history.

(56) References Cited

U.S. PATENT DOCUMENTS

| | | | | |
|---|---|---|---|---|
| 6,402,338 B1 * | 6/2002 | Mitzel | F21S 9/037 362/183 |
| 2011/0084102 A1 * | 4/2011 | Sautter | B60R 9/055 224/316 |
| 2021/0099126 A1 * | 4/2021 | Bunker, II | E04D 13/0315 |

* cited by examiner

*Primary Examiner* — Omar Rojas Cadima
(74) *Attorney, Agent, or Firm* — Stadler IP Law PLLC

(57) ABSTRACT

A light connector capable of connecting to a solar light and a light assembly that includes a light connector connected to a solar light or solar jar light, wherein the light assembly is capable of attaching to any structure that has a modifiable roof, such as an outdoor portable toilet. The light connector includes a main body having attachments and attachment receivers, a main support body having a lower support with a recess, and a grooved upper portion for engaging a solar light or solar jar light.

20 Claims, 10 Drawing Sheets

LIGHT CONNECTOR AND LIGHT ASSEMBLY

FIELD OF INVENTION

This invention is directed to a light connector. In particular, the present invention is directed to a light connector capable of connecting to a solar light. This invention is also directed to a light assembly that includes a light connector connected to a solar light, and more preferably a solar jar light, wherein the light assembly is capable of attaching to any structure that has a modifiable roof, such as an outdoor portable toilet.

BACKGROUND OF INVENTION

There are many times when a building may require lighting, but the building isn't connected to an electric source. In that case, a person may be required to bring a flashlight in order to see in the dark. In a lot of cases, bringing a flashlight isn't convenient and often isn't an effective light source.

One such building that doesn't typically have any lighting is an outdoor portable toilet. These are often used in settings where electricity isn't readily available and most portable toilets do not have a way to accommodate any electrical wiring. For this reason, portable toilets aren't typically able to provide any artificial lighting. Because of the lack of interior artificial lighting, many portable toilets have a roof that is lighter in color and is translucent. This works during the day to provide ambient lighting from sunlight, but at night, if the outdoor area isn't very well lit, then it can be hard to see inside the portable toilet.

For this reason, it would be very useful to find a way to provide artificial lighting inside a portable toilet. A battery-operated light that can be attached to the inside of a portable toilet is one such solution to the lighting problem. This solution isn't ideal because the batteries for the light need to be changed frequently and the adhesive for the light might not be strong enough to keep the light attached to the inside of the portable toilet.

Thus it would be beneficial to provide a self-powered light that is securely attached to a portable toilet (or any other feasible structure) thereby lighting the interior of the structure.

SUMMARY OF THE INVENTION

Accordingly, it is the subject of this invention to provide a light connector that allows a self-powered light to be securely attached to a building or structure requiring lighting such as a portable toilet.

In one embodiment, a light connector includes: a square translucent main body having a circular light focus that is elevated at the periphery sloping down towards the center and is located at the center of the square translucent main body and at least one attachment receiver capable of receiving an attachment, and preferably four attachment receivers; a circular main support body situated above the square translucent main body and having a grooved upper portion on the outside of circular main support body capable of engaging a jar or lid and having a lip at the bottom capable of preventing a jar from being overtightened; and, a lower support, wherein the lower support has at least one recess and convex curved from top to bottom.

In another embodiment, a solar light assembly includes: a square translucent main body having a circular light focus that is elevated at the periphery slowing down towards the center and is located at the center of the translucent main body and at least one attachment receiver capable of receiving an attachment; a circular main support body situated above the main body and having a grooved upper portion on the outside of circular main support body and a lower support that is convex curved from top to bottom, wherein the lower support has at least one recess; a solar light including a solar panel support having a solar panel positioned above a housing having a recess capable of allowing water to flow through and containing electronics, a light, and an interior grooved portion at the bottom interior of the housing; and wherein interior grooved portion is engaged with grooved upper portion of the circular main support body.

In another embodiment, the housing is configured with a bottom portion that has the same diameter from top to bottom, a tapered portion in the middle that tapers to an upper portion, and an upper portion that has the same diameter from top to bottom, the solar panel support is square at the top and transitions into a circular shape at the bottom, and the solar panel support friction fits to the housing.

DETAILED DESCRIPTION OF THE INVENTION

Figure 1:
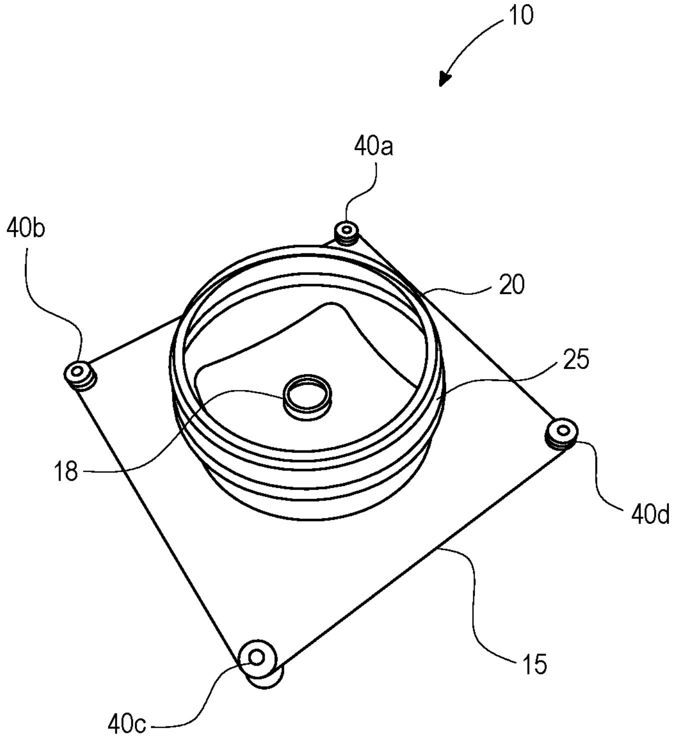
FIG. 1 depicts a perspective view of a light connector of the present invention.

List of Components
Light assembly—5
Light connector—10
Main body—15
Light focus—18
Main support body—20
Grooved upper portion—25
Lower support—30
Recesses—35
Attachments—40*a*, 40*b*, 40*c*, 40*d*
Attachment receivers—45*a*, 45*b*, 45*c*, 45*d*
Solar light—50
Solar panel—60
Solar panel support—65
Housing—70
Housing recess—75
Electronics—80

Light—85
Switch—90
Interior grooved portion—95

As shown in FIGS. 1- 4 , in one embodiment the light connector 10 includes main body 15 having attachment receivers 45*a*, 45*b*, 45*c*, 45*d*, that correspond with attachments 40*a*, 40*b*, 40*c*, 40*d*, and light connector 10 also includes main support body 20 having grooved portion 25, and lower support 30, which has recesses 35.

In a preferred embodiment, main body 15 is made of any conformable material such as conformable plastic. In another embodiment, main body 15 is made by 3D printing. Although depicted as a square body, main body 15 may be any suitable shape including a rectangle, triangle, circle, oval, or any other suitable shape. If embodied as a rectangle. triangle, circle, oval, or other shape main body 15 may have more or less than four attachment receivers and four attachments as necessary.

In one embodiment, main body 15 includes light focus 18, which is configured to focus the light. In this embodiment, light focus 18 is a series of concentric circles that are elevated with respect to main body 15 towards the periphery of light focus 18 and gradually slope and become recessed with respect to main body 15 towards the center of light focus 18. Light focus 18 directs the light to the center of main body 15 and provides better illumination. In a less preferred embodiment, light focus 18 may be an actual recess in main body 15.

Figure 2:
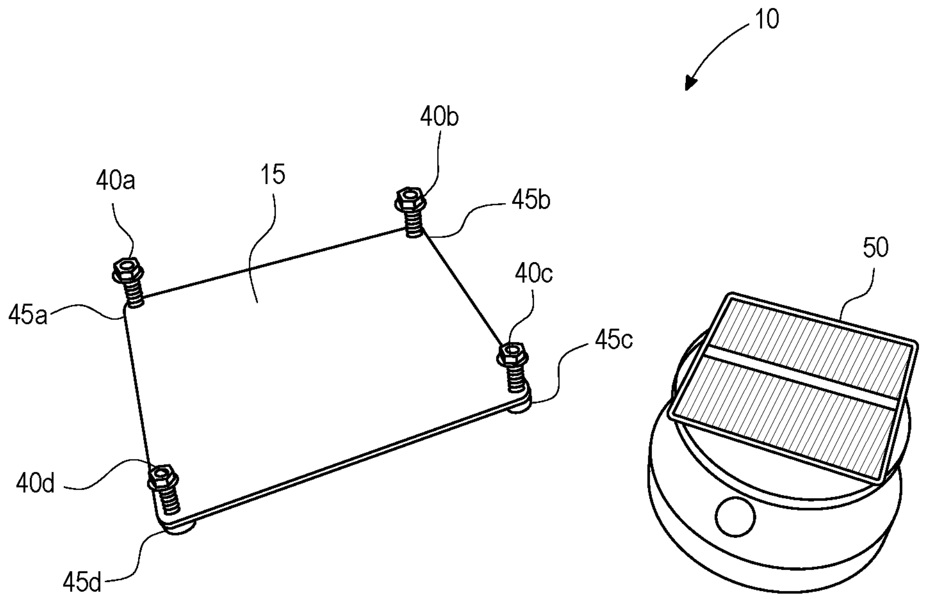
FIG. 2 depicts a perspective view of the bottom of a light connector and a solar light of the present invention.

Main body 15 attaches to the top of any roof (not shown) that is capable of being modified or is capable of receiving main body 15. Main body 15 also includes at least one attachment receiver. In FIG. 2, attachment receivers 45*a*, 45*b*, 45*c*, 45*d*, are shown. Attachment recesses 45*a*, 45*b*, 45*c*, 45*d*, are capable of receiving attachments 40*a*, 40*b*, 40*c*, 40*d*, respectively. In one embodiment, the attachment receivers may be embodied as simple hollow recesses and in more preferred embodiments, the attachment receivers may be embodied as posts or columns that include a hollow recess in the middle and wherein the hollow recess is capable of receiving an attachment such as a screw. In another embodiment, the hollow recess may include interior threads or grooves capable of receiving the threads or grooves of a screw. It is understood that while the FIGS. depict four attachment recesses and four attachments, there may be more or less than four attachment recesses as necessary. In a preferred embodiment, attachments are screws or any other suitable attachment capable of being received by attachment receivers. Less preferably, the attachments may be nails or something similar and main body 15 may be configured with or without attachment receivers.

As noted above, it is envisaged that light connector 10 will be used with a portable toilet. In use, light connector 10 will be attached to the top of a portable toilet (or any suitable structure or building that has a translucent roof capable of receiving a light connector). In particular, main body 15 will be placed at a suitable location on the exterior of the roof of a portable toilet or structure. The roof of portable toilet or structure will have holes drilled into it corresponding to the location of the attachments 40*a*, 40*b*, 40*c*, 40*d*, which will be inserted into the holes from the inside of the roof and will be received by attachment receivers 45*a*, 45*b*, 45*c*, 45*d*, respectively. In this way, light connector 10 is connected to the roof of the portable toilet or structure by way of main body 15.

In a preferred embodiment, main body 15 and main support body 20 are made of any conformable material such as conformable plastic. In another embodiment, main body 15 and main support body 20 are made by 3D printing. In a less preferred embodiment, main body 15 and main support body 20 are configured as separate pieces. In a preferred embodiment, light connector 10 is made by 3D printing and is configured as one single piece rather than main body 15 and main support body 20 configured as separate pieces.

Figure 3:
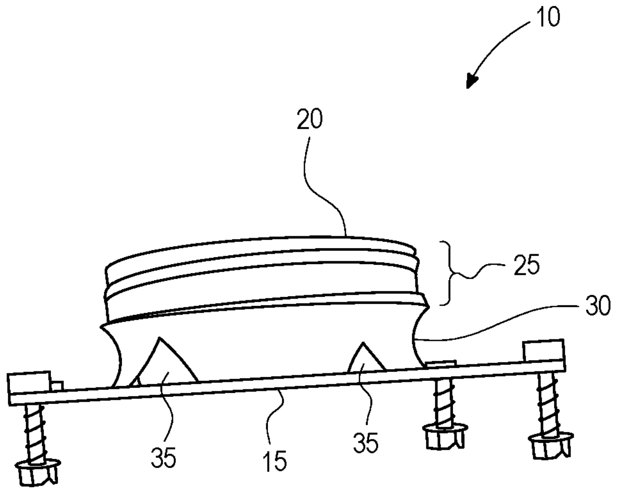
FIG. 3 depicts a side perspective view of a light connector of the present invention.
Figure 4:
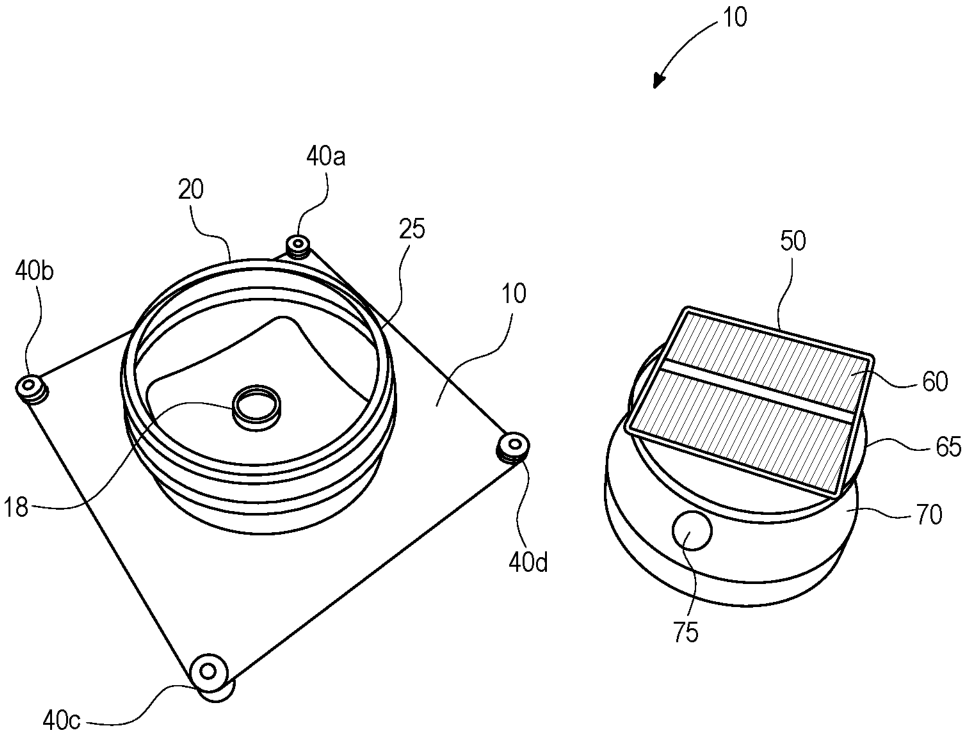
FIG. 4 depicts a top perspective view of a light connector and a solar light of the present invention.

As best shown in FIG. 3, main support body 20 includes grooved upper portion 25 and lower support 30. Grooved upper portion 25 is located at the top of main support body 20 and is configured with threads or grooves that are capable of engaging the threads or grooves of solar light, a solar light jar, a jar, or something similar. Towards the bottom of grooved upper portion 25, there is a lip that prevents the solar light or jar from being tightened any further.

FIG. 3 depicts lower support 30 located at the bottom of main body support 20. In a preferred embodiment, lower support 30 is concave curved from top to bottom. In a less preferred embodiment, lower support is not curved or is convex curved. Lower support 30 also includes recesses 35. In one embodiment, recess 35 is configured as a triangle shape. This allows the lower support 30 to maintain its strength, while allowing rain water or snow to drain. It is noted that recesses 35 may be any suitable shape. In a less preferred embodiment, lower support 30 does not includes recesses 35. In another embodiment, there is at least one recess 35 and in a preferred embodiment, there are four recesses.

FIGS. 4-10, depict solar light 50, which includes solar panel 60 having electronics 80, a light 85, switch 90, and housing 70 for electronics 80, light 85, and switch 90. Housing 70 may include recess 75, which allows for draining. Housing 70 includes an interior grooved portion 95 (FIG. 9) having grooves or threads such that solar light 50 is capable of connecting to light connector 10 and providing illumination into the portable toilet or other similar structure. Interior grooved portion 95 of housing 70 connects to light connector 10 by way of grooved portion 25 of main support body 20. In a preferred embodiment interior grooved portion 95 receives grooved portion 25.

Figure 10:
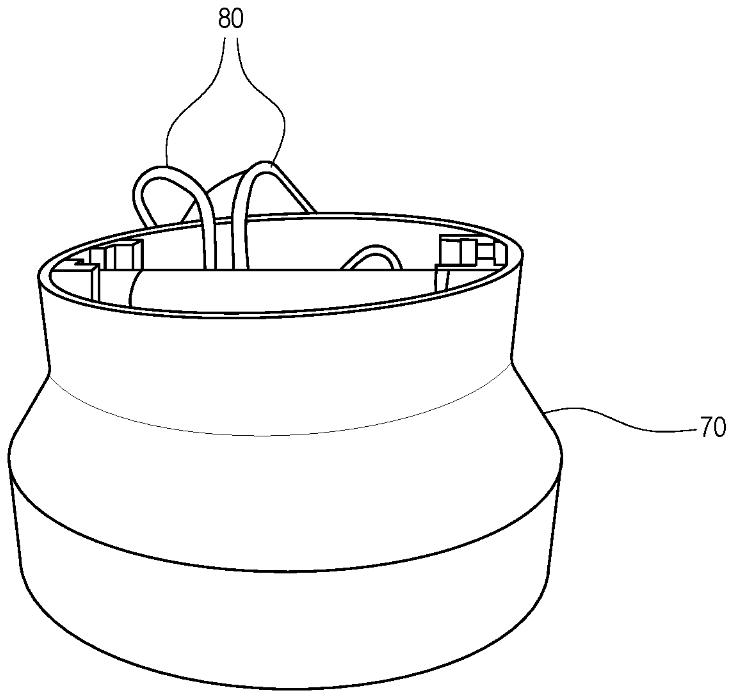
FIG. 10 depicts a side view of the housing of a solar light of the present invention.

Housing 70 may be configured as a circular piece having a tapered top, wherein the top of the housing is narrower than the bottom. In a preferred embodiment, as shown in FIG. 10, housing 70 is configured with a bottom portion that has the same diameter from top to bottom, a tapered portion in the middle that tapers to an upper portion, and an upper portion that has the same diameter from top to bottom. In a less preferred embodiment, housing 70 may be configured as a circular piece and may have the same diameter from top to bottom. In a less preferred embodiment, housing 70 may be configured as any suitable shape.

In a preferred embodiment, solar panel 60 may be square, while in other embodiments, solar panel 60 may be any suitable shape that allows for solar operation. Solar panel 60 may sit on a solar panel support 65, which has a friction fit to the top of housing 70. In a preferred embodiment, solar panel support 65 is square at the top and transitions into a circular shape at the bottom.

Figure 7:
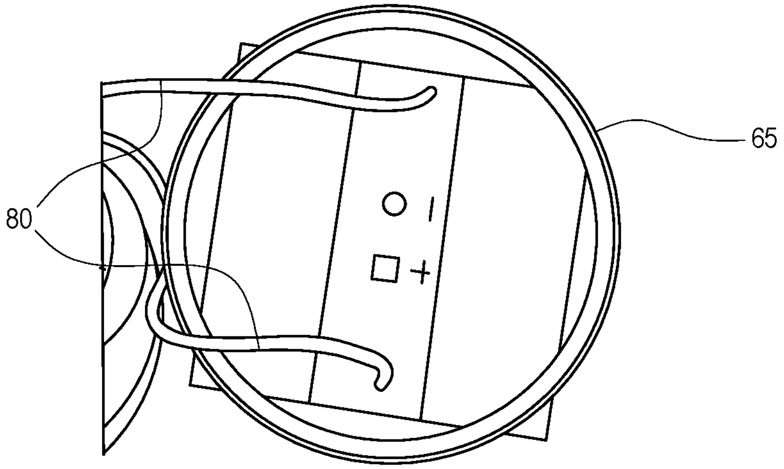
FIG. 7 depicts a bottom view of a solar panel of a light of the present invention.

The bottom of solar panel support 65 has connection points for connecting to electronics 80 as seen in FIG. 7. Solar panels and their electronics are well known and understood in the art and thus will not be described in further detail.

Figure 8:
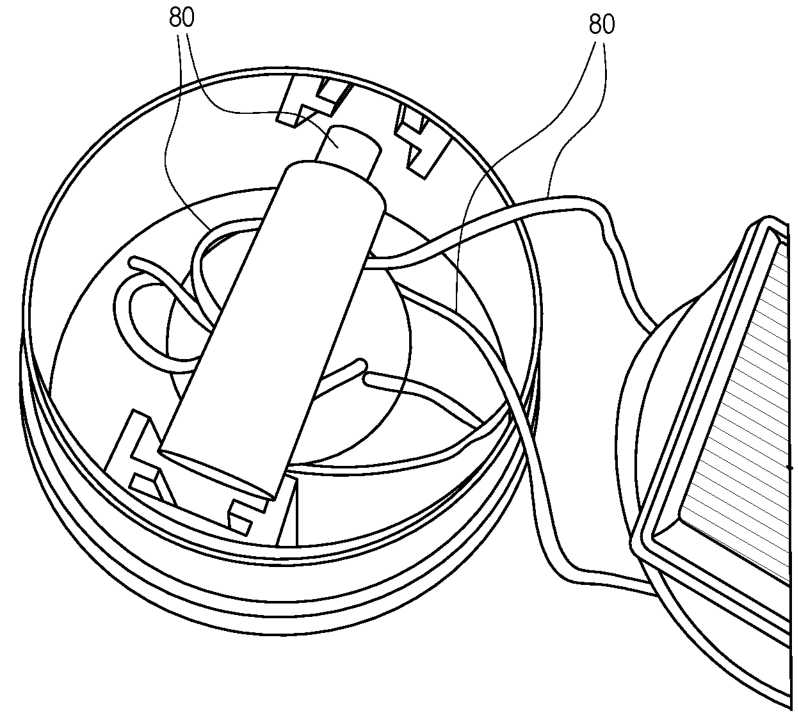
FIG. 8 depicts a top view of the housing interior of a light of the present invention.
Figure 9:
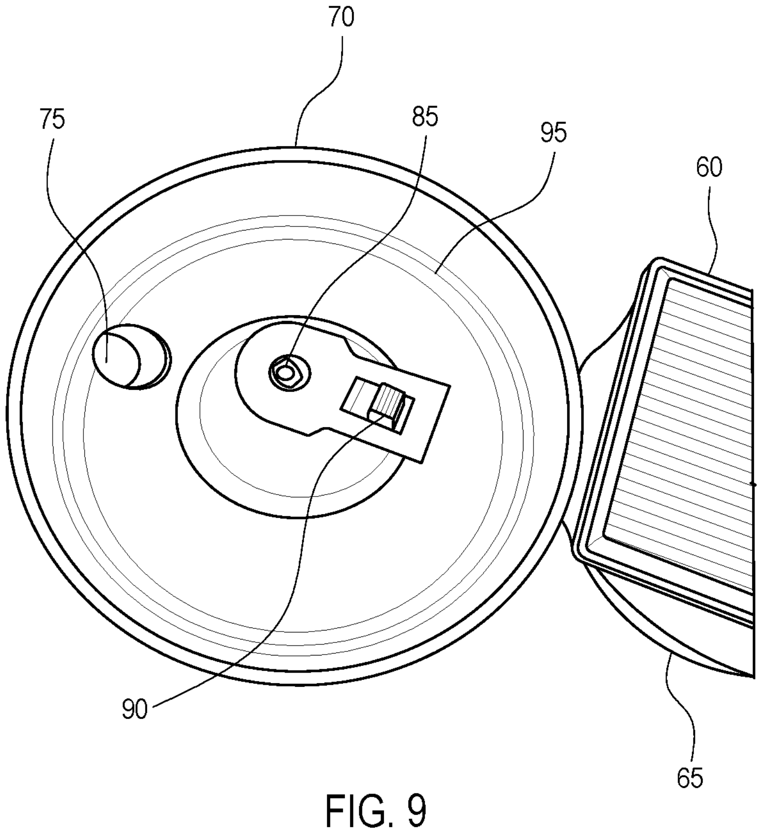
FIG. 9 depicts a bottom view of a solar light of the present invention.

As shown in FIG. 8, electronics 80 includes a battery, preferably a rechargeable battery, that is supported and held in place within housing 70, which is configured to support the battery. This may be done by way of a floor within housing 70.

Figure 5:
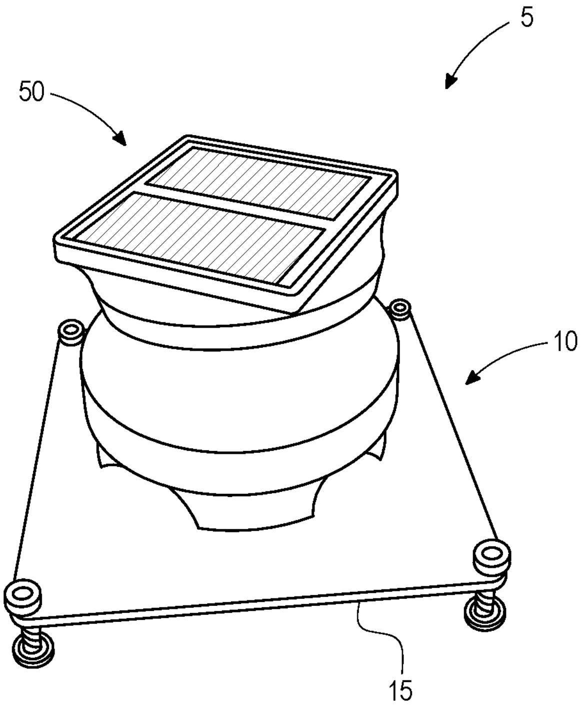
FIG. 5 depicts a perspective view of a light assembly of the present invention.
Figure 6:
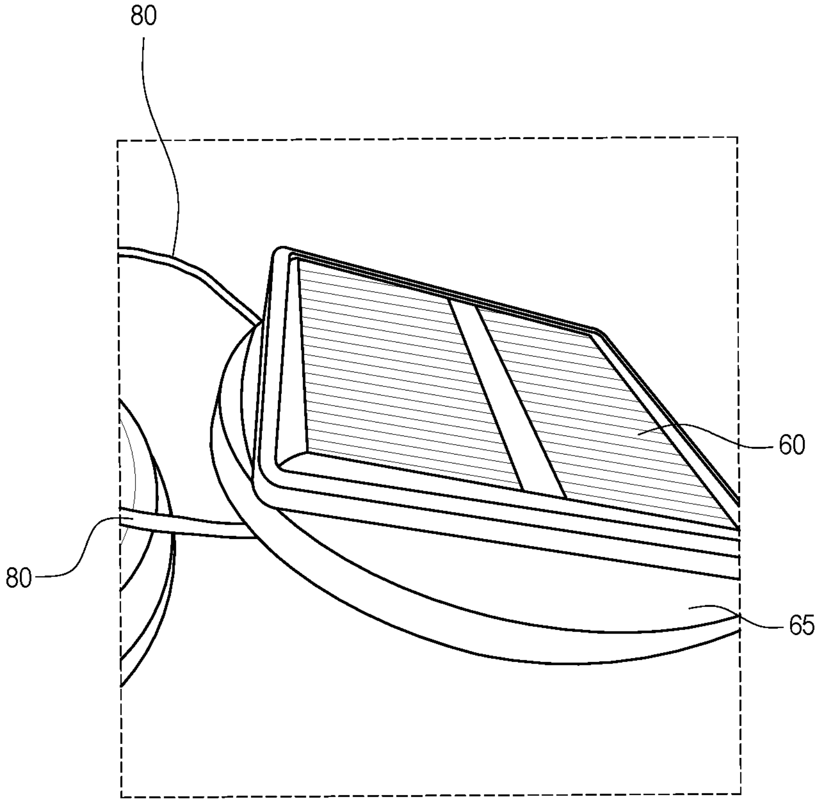
FIG. 6 depicts a close up perspective view of a solar panel of a solar light of the present invention.

As best seen in FIG. 5, light assembly 5 includes light connector 10 combined with a solar light 50. As can be seen, attachments 40*a*, 40*b*, 40*c*, and 40*d*, may be inserted into pre-drilled holes on the roof (not shown) of a portable toilet (or some other structure). The attachments 40*a*, 40*b*, 40*c*, 40*d*, are then inserted through attachment receivers 45*a*, 45*b*, 45*c*, 45*d*, respectively by way of a friction fit. The bottom of main body 15 will sit on the roof. When light 95 of solar light 50 is on, it will be focused through light focus 18, thereby illuminating the interior of the portable toilet. Preferably, the roof of the portable toilet and main body 15 are translucent, which allows light to shine into the portable toilet.

Although the light assembly 5 and light connector 10 have been described for use in connection with a portable toilet, it is understood that the invention is not so limited. The light assembly 5 and light connector 10 may be connected to any structure that has a translucent or transparent roof. For example, a structure used for camping may also have this type of roof.

It will be appreciated by those skilled in the art that while light connector and light assembly have been described in detail herein, the invention is not necessarily so limited and other examples, embodiments, uses, modifications, and departures from the embodiments, examples, uses, and modifications may be made without departing from the process and all such embodiments are intended to be within the scope and spirit of the appended claims.

What is claimed is:

1. A light connector comprising:

a square translucent main body having a light focus and at least one attachment receiver capable of receiving an attachment;

a circular main support body situated above the square translucent main body and having a grooved upper portion on the outside of circular main support body capable of engaging a jar or lid; and, a lower support, wherein the lower support has at least one recess.

2. The light connector of claim 1, wherein the light focus is circular in shape and is elevated at the periphery sloping down towards the center and is located at the center of the square translucent main body.

3. The light connector of claim 1, wherein lower support is convex curved from top to bottom.

4. The light connector of claim 1, wherein grooved upper portion has a lip at the bottom capable of preventing a jar from being overtightened.

5. The light connector of claim 1, wherein square translucent main body has four attachment receivers capable of receiving attachments.

6. The light connector of claim 5, wherein the four attachment receivers are located at each corner of square translucent main body and are further configured as posts or columns having a hollow recess capable of receiving attachments.

7. A light connector comprising:

a main body having at least one attachment receiver capable of receiving an attachment and; and a circular main support body situated above the main body and having a grooved upper portion on the outside of circular main support body and a lower support, wherein the lower support has at least one recess.

8. The light connector of claim 7, wherein main body also includes a light focus.

9. The light connector of claim 8, wherein the light focus is circular in shape and is elevated at the periphery sloping down towards the center and is located at the center of the main body.

10. The light connector of claim 7, wherein the main body is square and translucent.

11. A solar light assembly comprising:

a translucent main body having a light focus and at least one attachment receiver capable of receiving an attachment;

a circular main support body situated above the main body and having a grooved upper portion on the outside of circular main support body and a lower support, wherein the lower support has at least one recess;

a solar light including a solar panel support having a solar panel positioned above a housing containing electronics, a light, and an interior grooved portion at the bottom interior of the housing; and wherein interior grooved portion is engaged with grooved upper portion of the circular main support body.

12. The solar light assembly of claim 11, wherein the translucent main body is square.

13. The solar light assembly of claim 11, wherein the light focus is circular in shape and is elevated at the periphery slowing down towards the center and is located at the center of the translucent main body.

14. The solar light assembly of claim 11, wherein the lower support is convex curved from top to bottom.

15. The solar light assembly of claim 11, wherein grooved upper portion has a lip at the bottom capable of preventing the interior grooved portion at the bottom interior of the housing from being overtightened.

16. The solar light assembly of claim 11, wherein the housing has a recess capable of allowing water to flow through.

17. The solar light assembly of claim 11, wherein the housing is configured with a bottom portion that has the same diameter from top to bottom, a tapered portion in the middle that tapers to an upper portion, and an upper portion that has the same diameter from top to bottom.

18. The solar light assembly of claim 11, wherein the solar panel support is square at the top and transitions into a circular shape at the bottom.

19. The solar light assembly of claim 17, wherein the solar panel support friction fits to the housing.

20. The solar light assembly of claim 18, wherein the solar panel support friction fits to the housing.

* * * * *